| United States Patent [19] | [11] Patent Number: 4,486,096 |
| Endo et al. | [45] Date of Patent: Dec. 4, 1984 |

[54] DEVICE FOR MEASURING INCIDENT LIGHT

[75] Inventors: Kiyonobu Endo; Noriyuki Nose, both of Yokohama, Japan

[73] Assignee: Canon Kabushiki Kaisha, Tokyo, Japan

[21] Appl. No.: 285,404

[22] Filed: Jul. 20, 1981

[30] Foreign Application Priority Data

Jul. 25, 1980 [JP] Japan ............................... 55/102588
Jul. 25, 1980 [JP] Japan ............................... 55/102593

[51] Int. Cl.³ .............................................. G01J 1/42
[52] U.S. Cl. ..................................... 356/225; 354/476
[58] Field of Search ............... 350/167, 169, 171, 172, 350/162.17, 162.2, 162.21, 162.22, 162.23, 162.24; 356/218, 225; 354/59

[56] References Cited

U.S. PATENT DOCUMENTS 3,464,337  9/1969  Trankner ............................... 95/42
4,103,153  7/1975  Matsumoto et al. ............... 250/227
4,178,084  12/1979  Matsumoto et al. ............... 354/59

FOREIGN PATENT DOCUMENTS

42042 of 1978 Japan.
101922 of 1980 Japan.

Primary Examiner—Bruce Y. Arnold
Attorney, Agent, or Firm—Fitzpatrick, Cella, Harper & Scinto

[57] ABSTRACT

A system for measuring incident light includes: an optical system defining an optical path; a photodetector; and a plurality of beam splitters, with each beamsplitter having a different, predetermined area and adapted to be disposed in the optical path with, at any one time, only one beam splitter in the optical path; and means for measuring the light received by the photodetector.

5 Claims, 26 Drawing Figures

DEVICE FOR MEASURING INCIDENT LIGHT

BACKGROUND OF THE INVENTION

1. Field of the Invention

This invention relates to a device for measuring a light beam by means of a diffraction lattice (or grating). More particularly, the invention is concerned with such a device adaptable to a light metering device in a photographic camera.

2. Description of the Prior Art

The light metering device in a photographic camera splits a portion of an image-forming light beam, which has passed through an object lens 1 with a beam splitter, and the thus split light is detected by a light detector. For the light beam splitter useful for such a light metering device, there has so far been used a single half mirror which is obliquely provided in the camera. Such a beam splitting device for use in the camera, etc., should desirably be as thin as possible. U.S. Pat. No. 3,464,337 discloses a device, in which two members, each being provided on its surface with a plurality of slant reflective surfaces, are cemented together to form a prismatic line raster, and a part of the incident light is split for light metering thereby.

Other prior art patents for light metering devices, include U.S. Pat. Nos. 4,103,153 and 4,178,084. Generally speaking, a light beam, which has passed through an optical system, has a different angle of expansion depending on the F-number of the optical system. Therefore, when various light metering systems having different light metering areas are to be utilized with one light metering device, such metering device should be able to accurately measure a light beam in correspondence to variations in the aperture F-number of the optical system for the incident light beam, irrespective of the light metering system. In other words, the device should have a good proportionality in the F-number without regards to the size of a light splitting area.

SUMMARY OF THE INVENTION

It is therefore the primary object of the present invention to provide an improved device for measuring incident light, which is free from the abovementioned disadvantages inherent in conventional light measuring devices.

It is the secondary object of the present invention to provide a device for measuring incident light having good proportionality in the F-number irrespective of size of a light metering area.

It is the third object of the present invention to provide a light metering device for a single lens reflex camera which is capable of changing over from one light metering system to another without the necessity for any special adjusting operations.

DETAILED DESCRIPTION OF PREFERRED EMBODIMENTS

A typical light metering device according to the present invention uses a diffraction grating as a beam splitter therefor so as to reduce the thickness of the beam splitter as far as possible. The desired characteristic of this diffraction grating is that a useless diffracted light beam should not develop, and that image forming light beams and a light metering diffracted light beam of a particular order, both to be emitted from the diffraction lattice structure, should develop. The reason for this is that such a useless diffracted light beam causes a flared light beam or produces a ghost image which are detrimental to the formation and observation of an object image. It should be understood that, throughout this specification, the term "image forming light beam" means a light beam containing image information.

There has been proposed by the applicant of this invention a beam splitter which has solved the abovementioned problems (vide: Japanese Laid-Open Patent Application No. 53-42042). The beam splitter as disclosed in this specification uses a relief type diffraction lattice (grating) suitable for large scale industrial mass-production.

As mentioned in this Laid-Open Specification, the diffraction lattice having on its surface a periodical concavo-convex structure is usually called "a relief type diffraction lattice (or grating)". The beam splitter utilizing such a diffraction lattice structure is suited for a large scale industrial mass-production by a copying technique such as compression molding from a matrix, and so forth. Moreover, since it can be manufactured by utilizing various stable materials such as plastics, etc., which are well known in this field of technology, a cost advantage can also be enjoyed.

Figure 1:
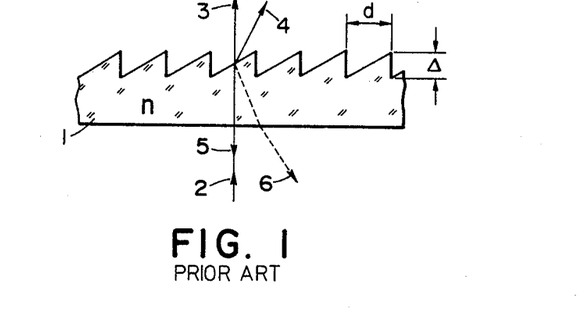
FIG. 1 is a cross-sectional view of a relief type diffraction grating.

Referring first to FIG. 1, explanations will be made as to the diffraction characteristic of the relief type (particularly, blazed type) diffraction grating. The beam splitter as disclosed in the afore-mentioned Japanese Laid-Open Patent Application No. 53-42042 particularly uses the blazed diffraction grating from among the relief type diffraction gratings having the characteristic of diffracting a substantial quantity of incident light into one particular diffraction order, with which the diffraction efficiency for the zero-order transmissive diffracted light for forming an object image is rendered 90% or higher, the diffracting efficiency for the first-order diffracted light for light metering is rendered a few %, and the diffracting efficiency for the diffracted light beams of other orders is rendered substantially zero. In FIG. 1, a reference numeral 1 designates the blazed type relief diffraction lattice with the concavo-convex structure of a pitch (periodical interval) d and a concavo-convex quantity $\Delta$ being formed on the surface of a transparent body having a refractive index n.

Figure 2:
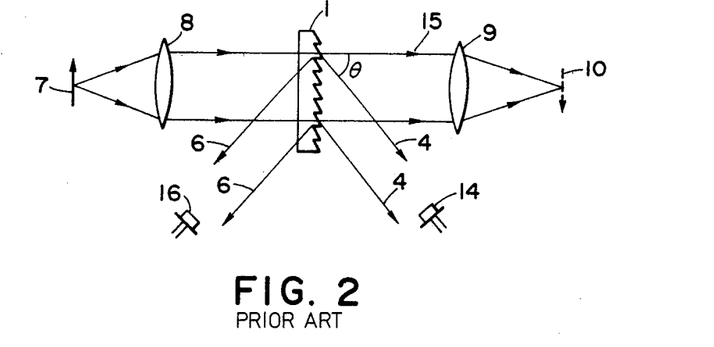
FIGS. 2 and 3 are respectively schematic diagrams showing the principle of a beam splitter for the relief type diffraction grating.

Now, the light beam 2 incident on the diffraction lattice 1 is diffracted, whereby the zero-order transmissive diffracted light beam 3 transmitting in the same direction as the incident light and the N-order transmissive diffracted light beam are generated as the transmitting light beams. A zero-oder reflective diffracted light beam 5 reflecting in the positive reflecting direction to the lattice plane and an N-order reflective diffracted light beam 6 are generated as the reflecting light beams. (N is an arbitrary integer.) FIG. 2 shows an example of a metering light beam by disposing the relief type diffraction lattice shown in FIG. 1 in an image forming optical system. The image forming optical system is to form an object image 10 by means of lenses 8 and 9, in the light path of which the diffraction lattice 1 is disposed. When the light beam is to be meterd in utilization of the N-order transmissive diffracted light beam 4, a photo-detector 14 is disposed, and, when the light beam is to be metered by use of the N-order reflective diffracted light beam 6, a photo-detector 16 is disposed. Further explanations will be given as to the former case as an example. In order that no influence may be caused to the function of the image forming device, the photo-detector should be disposed outside the image forming optical path, and the diffracted light beam, too, should be in the direction outside the lens 9.

In the beam splitter disclosed in the afore-mentioned Japanese Laid-open Patent Application No. 53-42042, the reason for using the first-order diffracted light beam as the split diffracted light to be taken out for light metering is that, as described in this Laid-open Specification, in the blazed type diffraction grating which is known at present it is difficult to make the diffracting efficiency of two diffracted light beams, whose diffraction orders are not mutually adjacent, higher than that of the other diffracted light beams of other orders.

In general, when the light beam is to be split in the direction of a diffraction angle $\theta$ using the diffraction grating of a pitch d, the following relationship is established between the pitch d and the diffraction angle $\theta$ of the N-order.

$$d \sin \theta = N\lambda \ldots 1$$

(where: $\lambda$ is a wave length of incident light beam) As is readily understandable from the above equation, the lower the order N of diffracted light beam for use in the light metering becomes, the smaller is the diffraction angle $\theta$ and the pitch d. However, the diffraction angle $\theta$ should be at a certain definite value and above, say, 30°, in order for the light-metering diffracted light beam to be taken outside the image forming light beam. On account of this, when a light-metering diffracted light of $\lambda = 0.55$ μm is to be split at the diffraction angle $\theta = 30°$ as mentioned above, in case the zero-order transmitting diffracted light beam and the first-order diffracted light beam are used as the image-forming light beam and the light-metering diffracted light beam, respectively, as in the beam splitter disclosed in the embodiment of the Japanese Laid-open Patent Application No. 53-42042, the pitch d of the diffraction lattice will be 1.1 μm as calculated from the above equation (1), which requires the diffraction grating to have extremely fine pitches, hence necessitating high manufacturing skill with a consequent increase in the cost of the mass-production of the diffraction grating.

In contrast to this, there is a Japanese Patent Application No. 54-10190 filed by the present applicant for a technique of obtaining a readily manufacturable beam splitter by first taking out a diffracted light beam of a high order (i.e., second order or higher) as the split light beam, while suppressing generation of diffracted light of lower orders than that to relax the conditions imposed on the relief type diffraction grating. In the following, explanations will be made as to such a beam splitter disclosed in this Japanese Patent Application.

For such a beam splitter to be used as the light metering device for a photographic camera, the diffraction lattice structure for the beam splitter should possess 90% or more of the diffracting efficiency for the zero-order transmissive diffracted light, and a few percent of the reflecting and diffracting efficiency for the N-order transmissive or reflective refracted light beam as the light metering beam.

Furthermore, it is required that the diffracting efficiency of the other orders be substantially zero. This is because such diffracted light beams generate a ghost image, or produce flared light beams, which are not favorable.

Figure 3:
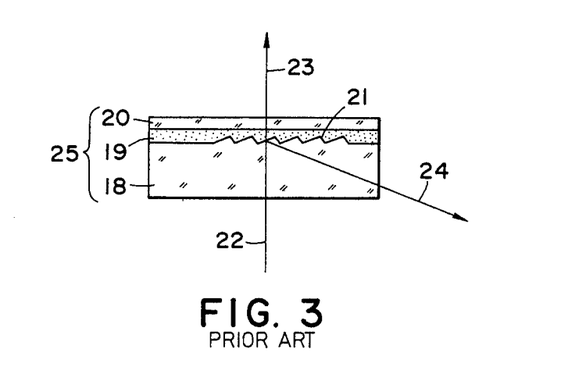

FIG. 3 illustrates one example of the beam splitter described in the abovementioned Japanese Patent Application No. 54-10190.

In FIG. 3, a reference numeral 18 designates an optically transparent body (e.g., acryl, polystyrene, polycarbonate, etc.) with the relief type diffraction lattice being carved in its surface. A numeral 19 refers to an adhesive layer (e.g., epoxy type adhesive agent) having a thickness sufficient to embed therein the relief type diffraction lattice, and having the same refractive index as that of the optically transparent body. A numeral 20 refers to an optically transparent body made of the same material as the adhesive layer 19, which is optically integrated with the optically transparent body 18 through the adhesive layer 19. Integral combination of these components constitute the beam splitter 25. Further, a dielectric film consisting of silicon oxide, titanium oxide, etc., is vapor deposited on the surface of the relief type diffraction lattice to constitute a reflective coating 21 having a certain designed reflection factor.

Let us now consider a case, wherein a light beam 22 from an object is projected into the beam splitter 25. The incident light beam 22 is reflected, in one part, by the reflective coating 21 on the surface of the relief type diffraction grating, and transmits, in its remaining part, through the beam splitter. The light beam which has been reflected by the reflective coating 21 is subjected to a phase difference due to the concavo-convex structure of the reflective coating 21, whereby a reflected and diffracted light beam 24 is generated. In this case, the N-order reflecting and diffracting efficiency $\eta_R(N)$ is obtained from the following equations.

$$\eta_R(N) = R \cdot \frac{\sin^2(N\pi - \beta)}{(N\pi - \beta)^2} = R \cdot \text{sinc}^2(N\pi - \beta) \quad (2)$$

$$\beta = 2\pi n \Delta / \lambda \quad (3)$$

Figure 4:
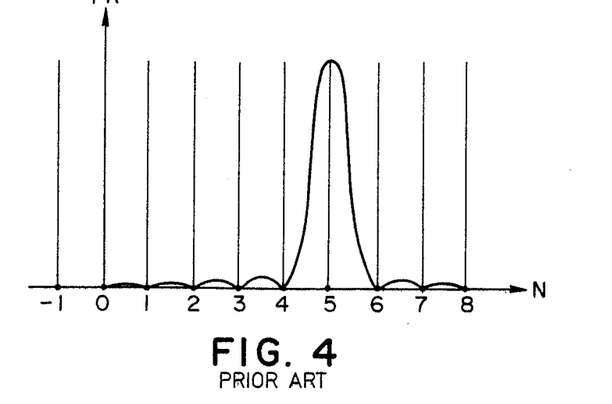
FIG. 4 is a graphical representation showing reflecting-diffracting efficiencies of the relief type diffraction grating.

(where: R is the reflection factor of the reflective coating 21) The above equations are the approximate equations in case the concavo-convex quantity $\Delta$ of the diffraction grating is smaller than the pitch d. If a fifth-order reflective diffracted light beam is used as the light metering light beam, the concavo-convex quantity $\Delta$ is so determined that the phase difference $\beta$ is $5\pi$, thereby forming the diffraction lattice surface. At this time, the reflected light from the diffraction grating includes the fifth-order reflected and diffracted light beam 24 alone, and no reflected and diffracted light beam of other orders is present therein. This situation is shown in FIG. 4, and the diffracting efficiency of the fifth-order reflective diffracted light 24 will become $\eta_R(5) = R$ from the equation (2). By appropriately setting the reflection factor of the reflective coating 21, there can be obtained a light metering light beam of a desired intensity. Since this light metering light beam is the fifth-order diffracted light beam, the diffraction grating for use as the beam splitter may be sufficient if its pitch is five times as mild as that in the diffraction grating for use in the first-order diffracted light.

As regards the transmitted light, the light beam 22 projected into the beam splitter 25 in FIG. 3 passes therethrough for a portion of $(1-R)\%$ thereof except for the abovementioned reflected and diffracted light, provided there is no reflection from a surface other than the reflective coating 21 or no loss in a transmission medium.

In this beam splitter, since the transparent body 18 has the same refractive index as that of the adhesive layer 19, no phase difference occurs in the transmitted light due to the relief type diffraction lattice structure. On account of this, no diffracted light of the orders other than zero occurs, and the transmitted light consists substantially of the zero-order transmitted and diffracted light for the image formation.

Figure 5:
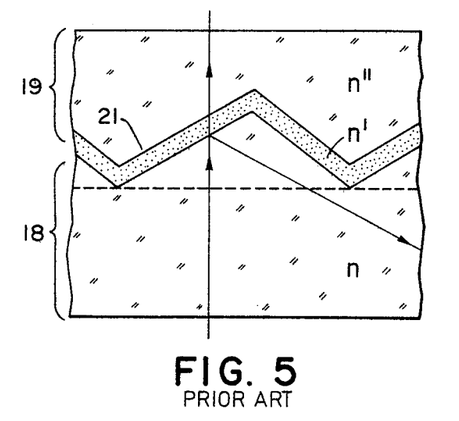
FIG. 5 is an enlarged cross-sectional view, in part, of the beam splitter shown in FIG. 3.

FIG. 5 shows a partial, enlarged cross-sectional view of the relief type diffraction lattice structure in FIG. 3. As is seen from this illustration, the beam splitter produces only the high order reflected and diffracted light necessary for the light metering and the zero-order transmitted and diffracted light necessary for the image formation, but no diffracted light of other orders. These two diffracted lights can be controlled for a ratio of their respective diffracting efficiencies by appropriate setting of the reflection factor of the reflective coating 21.

Further details on the above-mentioned points are described in the Japanese Patent Application No. 54-10190. Such a beam possesses a means which makes the lattice surface of the diffraction lattice structure as one reflective surface. By this reflective surface, there can be obtained the reflected and diffracted light of an arbitrary order. Further, by providing a means to control the phase difference of the transmitted light with respect to the light transmitting through the reflective surface, no harmful light other than a desired split light occurs, and a large split angle can be obtained, even when the diffraction lattice structure of a relatively mild pitch is used. On account of this, the beam splitter is suited for industrialized mass-production.

Now, in the following, explanations will be given as to a case, wherein the beam splitter provided with the relief type diffraction lattice structure as so far mentioned is applied to the light metering device for a single lens-reflex camera.

Figure 6A:
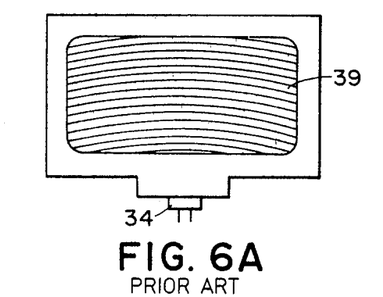
FIGS. 6A and 6B illustrate an example of using the relief type diffraction grating shown in FIGS. 1 to 5 for a light metering device.
Figure 6B:
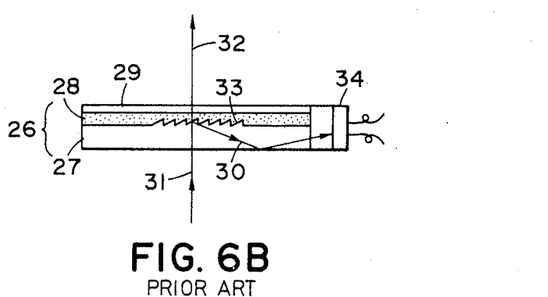

FIGS. 6A and 6B illustrate a beam splitter very useful for taking out the split light beams. FIG. 6A is a plan view of the beam splitter, while FIG. 6B is a cross-sectional view thereof. This beam splitter is of high utility as the light metering device. In this beam splitter, the reflected and diffracted light as split for the light metering is led to a photo-detector 34, while being totally reflected by the inner surface of the transparent body 27. Accordingly, the angle of diffraction of the reflected and diffracted light is determined by the conditions for producing the total reflection.

Since such a beam splitter having total reflection is composed of a light transmitting member and the diffraction grating, both being integrally combined, the device can be disposed in the optical device interior with great advantage.

The reason for the lattice lines 39 being curved as shown in FIG. 6A is to enable the split light from every point to be efficiently impinged on the photo-detector 34. Therefore, the beam splitter of FIGS. 6A(6B), when disposed in the image forming light beam of the camera, is capable of leading a part of the split image forming light beam into the photodetector for the light metering.

Since the beam splitter, as mentioned in the foregoing, has as one of the characteristics to provide the reflective layer on the relief type diffraction grating, the light metering system can be changed over from one to the other, or vice versa, by doing the following.

In the first place, outline explanations are given as to the light metering systems adopted in the photographic cameras. That is, the light metering system is largely classified into the following three categories: (1) center-preferred average light metering system; (2) partial light metering system; and (3) spot light metering system.

The characteristics of the light metering systems mentioned above will be briefly stated in the following.

(1) Center-preferred average light metering system:

This is the light metering system most of the conventional AE (Automatic Exposure) cameras have adopted. Although the system tends to measure more quantity of light from the center part of a photographic object, this can be said to be the safest light metering system because it measures average light quantity for an entire photographic scene. However, this system has the following disadvantages when a photographic scene has a sharp contrast, e.g., a man in shadow under trees, which photographic object is isolated in, or surrounded by, the bright blue sky. Due to an average light metering of the photographic scene as a whole, the light quantity from the blue sky in the scene gives influence on the shadowed object, whereby the excessive light metering tends to be done on the photographic object, and the man under the tree will be photographed in an under-exposed condition in the resulting picture.

(2) Partial light metering system:

This light metering system measures the light quantity of a scene in a certain limited region. In the above-described photographic object, an appropriate exposure setting can be done with respect to the man as the photographic object. However, the scene surrounding the man in the picture is over-exposure. In addition, according to this light metering system, the photographic object should, without failure, be placed within the light metering region at the time of the exposure determination, hence the system is not suitable for a moving object.

(3) Spot light metering system:

This system measures light quantity in a region more limited than in the case of the partial light metering system. Accordingly, while it has advantages over the partial light metering system, it has a disadvantage of its own.

Although most of the photographic cameras now available in general market adopt any one of the above-described light metering systems, it is desirable that, for various photographic objects to be photographed at an intended exposure level, the above-mentioned three light metering systems be changed or switched over in accordance with a particular photographic scene.

Since the afore-described beam splitter according to the present invention provides the reflective layer on the relief diffraction grating as mentioned above for appropriate light splitting, it is readily adapted to operate for these three light metering systems.

Figure 7A:
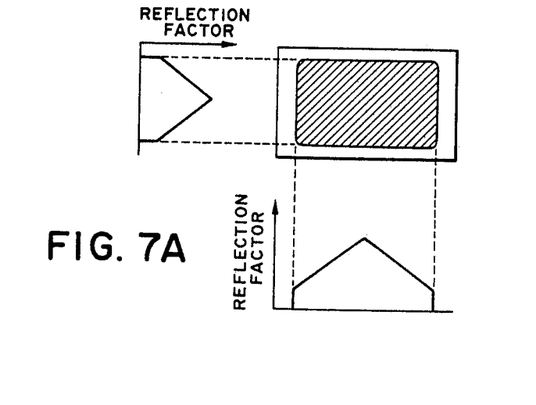
FIGS. 7A, 7B and 7C illustrate various possibilities of effecting different light metering systems depending on the manner of providing a light reflecting layer.
Figure 7B:
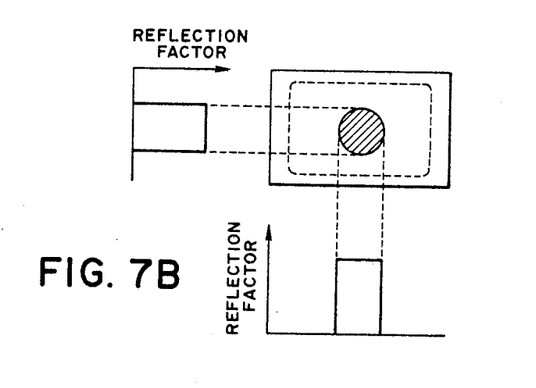
Figure 7C:
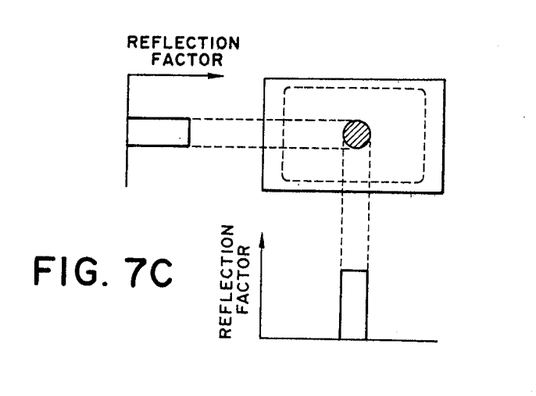

FIGS. 7A, 7B and 7C illustrate examples of these three light metering operations by the use of the beam splitter according to the present invention. In these figures of the drawings, those areas surrounded by dash lines correspond to the lattice section. For the beam splitter of the center-preferred average light metering operation, a reflective layer having a high reflection factor at its center part is vacuum-deposited on a required region (in the drawing, the region surrounded by solid line and hatched) as shown in FIG. 7A. Such a light metering system, where the reflective layer has its preference in its reflection factor depending on a location, has already been proposed by the present applicants in a separate application.

Further, the beam splitters for the partial light metering and spot light metering operations can be made by providing the reflective layer on only a required region in one specific part of the lattice section as shown in FIGS. 7B and 7C.

The construction of the beam splitter for use in the present invention has already been explained in the above discussion of FIGS. 1 and 3. It can, therefore, be readily understood from the explanation of FIG. 3 that when the lattice section is not provided with a reflective layer, it is equivalent to no not providing an optical lattice. As the consequence of this, a region in the lattice section other than the reflective layer can be considered transparent.

Figure 8A:
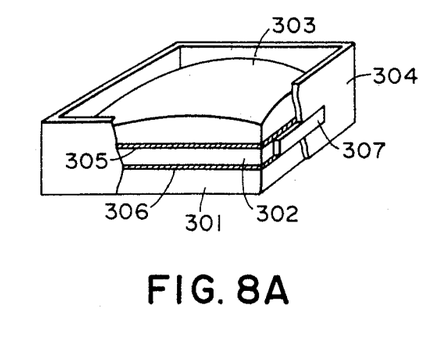
FIGS. 8A and 8B are respectively a perspective view of a beam splitter and a side elevational view, partly in cross-section, of a single lens reflex camera incorporating therein the beam splitter of FIG. 8A, as an example of the invention.
Figure 8B:
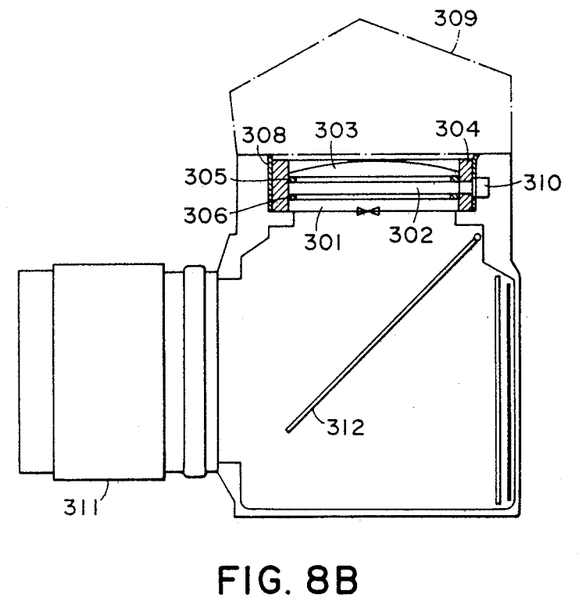

Referring now to FIGS. 8A and 8B, explanations will be given in the following as to one example of the light metering device incorporated in a photographic camera capable of selecting any appropriate light metering system for a given purpose.

FIG. 8A shows a unit of a light metering device, in which a focusing plate 301, a beam splitter 302, and a condenser lens 303 are integrally set in a unit frame 304. In this unit structure, spacers 305, 306 are provided on both upper and lower surfaces of the beam splitter 302 so that the boundary layers at these surfaces may be in contact with air. Further, a projected portion 307 is provided at a light emitting end face of the beam splitter 302 with a thickness meeting a thickness of the unit section so as to make the distance from the light emitting end face to the photo-detector as close as possible.

Such a construction is made with a view to minimizing light loss due to its divergence, because, as has already been mentioned, the light beam emitted from the light emitting end face tends to diverge.

FIG. 8B is a side elevational view, partly in cross-section, of a single lens photographic camera which incorporates therein the beam splitter of the above-mentioned construction. An object image is formed by a lens 311 on a focusing plate 301 through a quick-return mirror 312, and focusing operation is effected. The image forming light beam is thereafter split by the beam splitter 302 in its one part, and led into the photo-detector 310 where the light is metered for determination of appropriate exposure.

By setting each of the beam splitters shown in FIGS. 7A, 7B and 7C in a separate unit frame as shown in FIG. 8A, and placing these light metering units at the position in FIG. 8B in an exchangeable manner, it is possible to use discretely the center-preferred light metering system, the partial light metering system, and the spot light metering system in one camera, which is very convenient.

In FIG. 8B, a pentagonal prism 309 shown in a dot-and-dash line is detachable from the camera body. Exchange of the light metering unit can be so effected that the pentagonal prism 309 is first removed from the camera body, and the light metering unit is placed inside the camera, positioning being done by a spring 308 for every unit.

In the following, explanations will be given as to the nature of the beam splitter having its relief lattice curved, as shown in FIG. 6, to enable it to have an increased light converging function along with the beam splitter being effective in the above various light metering systems.

Figure 9:
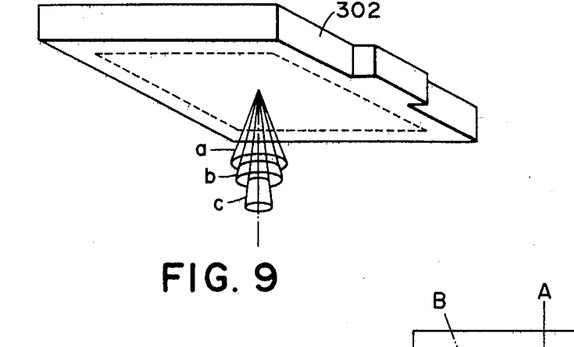
FIG. 9 shows various light beams entering into the beam splitter.

FIG. 9 shows expansion of a light beam incident on the beam splitter 302. As shown in FIG. 8B there usually enters into the beam splitter a light beam which expands in accordance to the lens aperture, and the light orienting characteristic of the focusing plate 301.

In FIG. 9, when the lens aperture value is F1.4, there enters into the beam splitter 302 a light beam having an angular expansion existing in accordance with the aperture value of F1.4, e.g., a light beam a. In the case of the aperture value being F2, F2.8, etc., light beams b and c, respectively, enter into the beam splitter.

Figure 10:
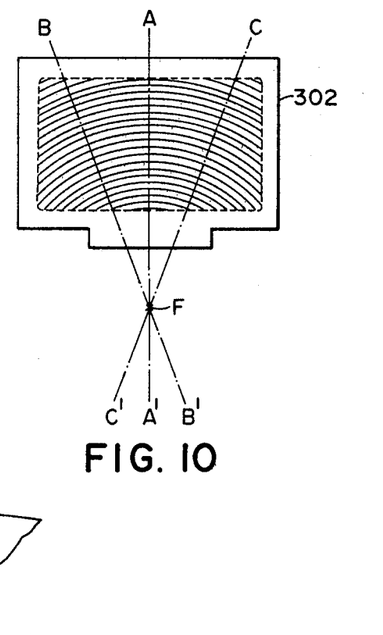
FIGS. 10, 11, 12 and 13 are respectively schematic diagrams showing the reason for convergence of a split light beam.

In FIG. 10, the relief lattices of the beam splitter 302 are arranged in concentric circles or in a spiral form with a point F as the center of curvature. At the cross-sectional plane A-A', B-B' or C-C' passing through the center of curvature F, the relief lattices are seen, without exception, in the same shape (angle of inclination of the slant surface, pitches, etc.).

Figure 11:
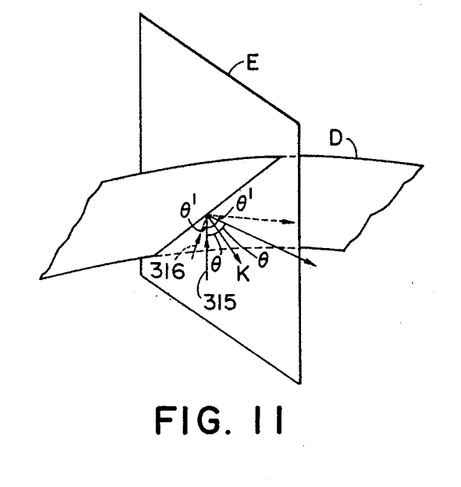

FIG. 11 shows a state of reflection of the light beam within this plane, i.e., within the cross-sectional plane passing through the center of curvature F. In FIG. 11, a reference letter E designates the cross-sectional plane passing through the center of curvature F, and D refers to the reflecting surface of the relief lattice. Assume now that a normal vector at the reflecting surface of the relief lattice is K. The normal vector K is in this plane. Accordingly, reflected lights of incident lights 315, 316, etc., in this plane should inevitably be present therewithin. In other words, the reflected lights are directed towards the center of curvature F, while being totally reflected at both upper and lower surfaces of the beam splitter 302 as shown in FIG. 12.

Figures 12, 13, 14:
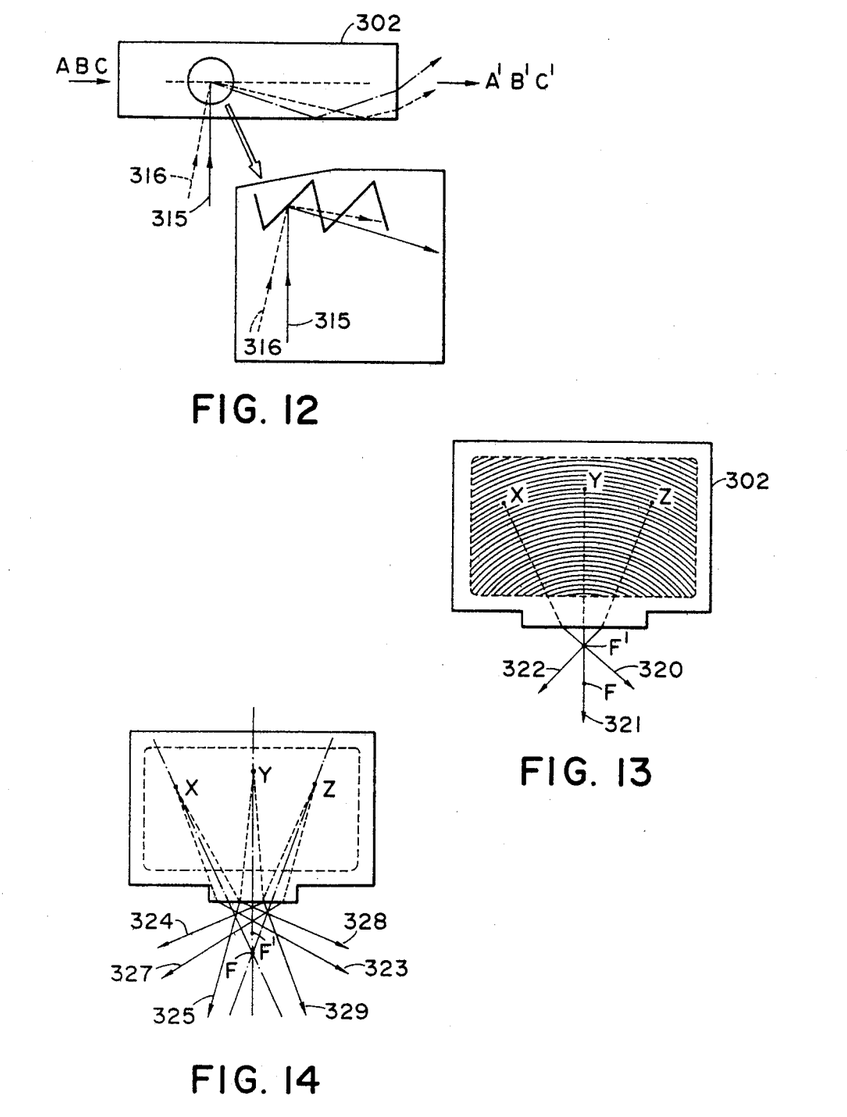
FIG. 14 is a diagram showing a state of propagation of the light beams entering into the beam splitter at certain angles of incidence.

However, those light beams 320, 321, 322 projected into points X, Y, Z, respectively, and reflected at these points, as shown in FIG. 13, are refracted when they are emitted from the light emitting end face of the beam splitter 302 into the air, and are converged on a point F' which is in front of the center of curvature F.

From what has been stated above, it will be seen that, of the light beams entering into the beam splitter, those components within the cross-sectional plane passing through the center of curvature F all converge on the point F'.

On the other hand, those light beams having an angular component to the above-mentioned cross-sectional plane do not converge on the point F' as shown in FIG. 14. In FIG. 14, of light beams entering into the points X, Y, Z and reflected at these points, those lights 323, 324, 325 or 327, 328, 329 having one and the same angular component diverge in the vicinity of the point F'. (This is quite natural, because the incident light vector and the relief surface normal vector are not in one and the same plane, hence the reflected light vector is not within the plane passing through the center of curvature F, while the light is led toward the reflected light vector.)

Of the light beams entering into the beam splitter, the light component entering perpendicularly into the beam splitter should apparently exist within the plane passing through the center of curvature F. From this, it can be said that more of the light beam component, which tends to enter perpendicularly into the beam splitter, exists locally in the vicinity of the converging point F' of the slit light beam.

In FIG. 8, an example has been shown, wherein the beam splitter is applied as the light metering device for a photographic camera. One of the functions to be satisfied as the light metering device for the camera is proportionality in F-number. The term "proportionality in F-number" means a degree of changing exposure level in proportion to changing lens aperture. Ideally speaking, it is desirable that the quantity of light incident on the photo-detector be reduced to a half by one-stage constriction of the aperture.

From the above-described characteristic of the beam splitter, if the device is placed at the light converging point F', the light quantity received at the photo-detector consists, at a high ratio, of the vertical component in the light beams entering into the beam splitter. When the lens aperture becomes small, the light beam component to reach the beam splitter is mostly occupied by the light beam component close to the vertical component, as a matter of course. On the other hand, however, when the lens aperture becomes large, the light beam having a wide angular component enters into the beam splitter, on account of which the ratio of the vertical component becomes lower than that in the case of the small aperture. As the consequence of this, positioning of the photo-detector in the vicinity of the point F' means that it receives a large amount of light beam of the small aperture component, whereby a ratio between the light beam components at the large aperture side and the small aperture side is broken, and the proportionality in the F-number deteriorates.

From the above, it will be seen that a favorable proportionality in F-number can be obtained by placing the photo-detector off the light converging point F'.

Furthermore, in case the light metering system is to be used by switching over from one to the other, i.e., the center-preferred average light metering system, the partial light metering system, and spot light metering system, the following point should be taken into account.

Figure 15A:
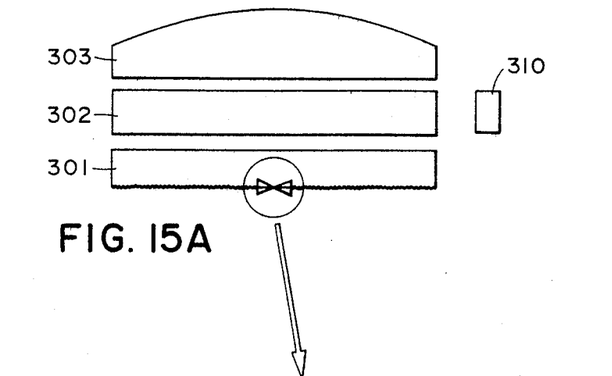
FIGS. 15A and 15B show respectively an exemplary layout of the light metering system, and a state of the light beam entering into the beam splitter through a focussing plate.

FIG. 15A shows one example of the layout of the light metering system, wherein the focusing plate 301, the beam splitter 302, the condenser lens 303, and the photo-detector 310 are arranged in the aforementioned order as taken from the side of the object lens. In this system layout, the light beam entering into the beam splitter 302 always passes through the focusing plate 301.

There are many kinds of focusing plate 301 manufactured by various producers and available in the general market. As one example, the following explanations will be made referring to a case of using the focusing plate with a split micro-range-finding section, which generally used.

Figure 15B:
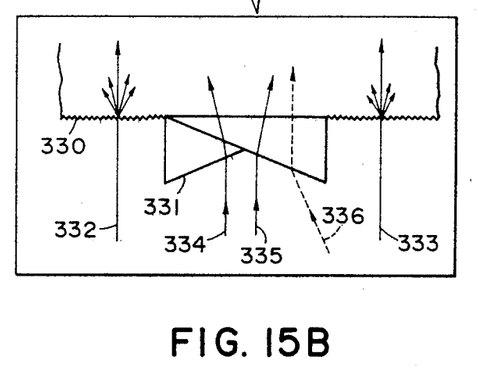

FIG. 15B is a partially enlarged view of the light metering system shown in FIG. 15A, wherein the lower surface of the focusing plate is composed of a mat surface 330 and a micro-prism section 331 at the center thereof. Let us now consider a case, wherein light beams 332, 333, 334 and 335 are projected vertically to the focusing plate. The light beams 332, 333 entering into the mat surface 330 are scattered in accordance with the light orienting characteristic of the mat surface 330 and are directed to the beam splitter 302. On the other hand, the light beams 334, 335 entering into the prism section 331 are refracted at this prism section, and projected to the beam splitter 302 with a certain angle. The mat surface receives more of the light beam component which is oriented in the same direction as the incident direction with the consequence that, while the light beam entering into the focusing plate which corresponds to the aperture value of the lens is scattered by the focusing plate, it is projected into the beam splitter at its incidence with an angular component of the light beam. However, at the prism section, the light beam entering vertically into the beam splitter is impinged on the focusing plate at an angle as is the case with the light beam 336. In other words, the light beam enters into the beam splitter at an angle different from that of the light beam entering into the focusing plate.

From the above explanations, it will be understandable that the light beam at the light converging point F' contains more of the light beam component at the small aperture side of the lens for the light component entering into the mat surface, and that it contains more of the light beam component at the large aperture side for the light component entering into the prism section.

Figure 17:
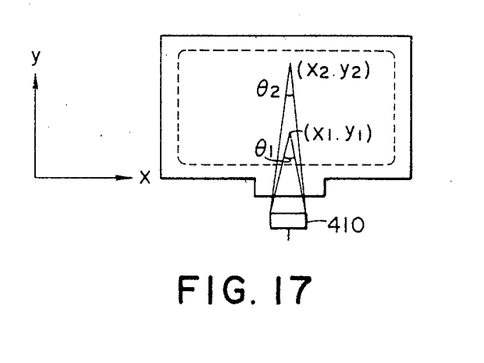
FIG. 17 is a plan view of the light metering device to effect various light metering systems by controlling the reflection factor of the beam splitter.

Accordingly, when the light metering system is switched over from one to another by changing the reflecting layer region as shown in FIG. 17, a degree of influence of the light beam behaviour, which the mat surface and the prism section receive, differs among the center-preferred average light metering system, the partial light metering system, and the spot light metering system. Particularly, in the case of the spot light metering, there occurs such a situation that only the upper part of the prism section has the reflecting layer with the consequence that there also occurs such an inconvenience that the proportionality in F-number differs from one light metering system to the other. In order to solve these problems, it is necessary that the positional relationship between the photo-detector and the light beam distribution, which the split light beam from the beam splitter produces when it emits from the light emitting end face, be made equal among these light metering systems.

For the purpose of realizing the above-mentioned equivalence, there are two possible methods of: (1) causing the photo-detector position to shift; and (2) causing the position of the light converging point F', i.e., the center of curvature F, to shift.

The former method is not practical because the photo-detector mounted in the camera main body should be moved.

Figure 16A:
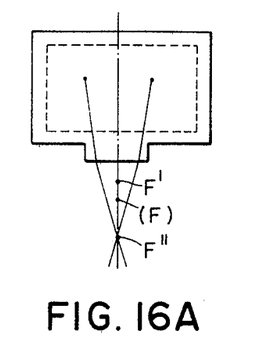
FIGS. 16A through 16E illustrate various beam splitters used in the actual embodiments of the present invention.
Figure 16B:
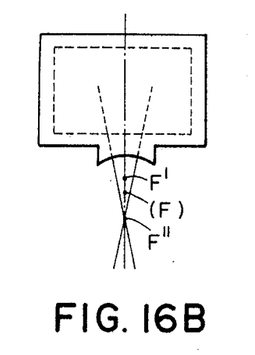
Figure 16C:
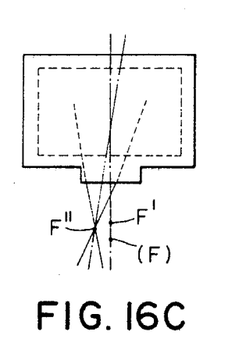
Figure 16D:
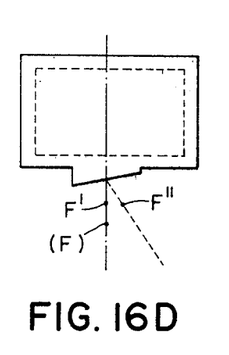
Figure 16E:
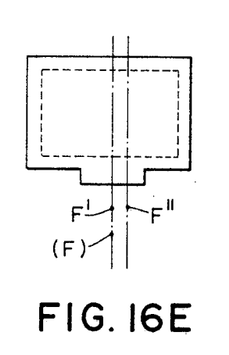

As the latter method, three embodiments are shown in FIGS. 16A, 16B and 16C. The first embodiment in FIG. 16A shows a situation when the curvature itself of the relief lattice is changed. For instance, if the curvature is made large, the light converging point F' can be shifted to a point F" farther from the lattice than is F'. The second embodiment in FIG. 16B incorporates a modification of the light emitting end face. For example, by shaping the end face as a cylindrical concave lens as shown in the drawing, the light converging point F' can be shifted to F". The third embodiment in FIG. 16C is to move horizontally the center of curvature, thereby enabling the light converging point F' to shift to F". In place of forming the light emitting end face in a prism shape as in FIG. 16D, the center of curvature can also be laterally shifted as shown in FIG. 16E.

In any of the above-mentioned embodiments the light converging point is shifted so that the beam splitter for each of the light metering systems may have a constant light metering capability.

As stated in the foregoing, the light metering device according to the embodiments of the present invention is capable of providing an appropriate exposure in conformity with an object to be photographed, and also, of unifying the light metering characteristic for any light metering system by changing the center of curvature of the relief lattice section in accordance with such a light metering system. Therefore, by the use of this light metering device, there can be realized a practical camera in which the light metering system can be changed.

In the following a further embodiment of the light metering device according to the present invention will be explained. In this light metering device, when the light metering unit for each light metering system is used by changing from one unit to another, the total light quantity led out of the beam splitter to the photo-detector is coincident, whereby trouble in effecting the exposure correction can be avoided every time the light metering unit is exchanged in each light metering system.

As shown in FIG. 17, a quantity of light propagated from each point (x, y) of the lattice section and led into the photo-detector 410 is associated with an angle $\theta$, at which the photo-detector 410 is viewed from each point (x, y). For instance, if the viewing angle of the photo-detector 410 from the near point $(x_1, y_1)$ is assumed to be $\theta_1$, and the viewing angle of the photo-detector 410 from a far point $(x_2, y_2)$ is assumed to be $\theta_2$, the viewing angle $\theta$ from the far point $(x_2, y_2)$ becomes smaller as a matter of course. Of the light beams propagated from these points, the light beams included by the angle $\theta_1$ are led to the photo-detector at the near point $(x_1, y_1)$, while the light beam included by the angle $\theta_2$ are led to the photo-detector at the far point $(x_2, y_2)$. Accordingly, even if the reflecting layer of the same reflection factor is provided on the entire surface, the light quantity led into the photo-detector from each point differs. Further, since the propagating distance also differs, there is an absorption loss of light due to the transmitting medium. Hence consideration should be given to the weight, from which the light beam comes, when considering the total light quantity to be led to the photo-detector. In other words, if a function to represent this weight is expressed by W(x, y), the light beam to be led to the photo-detector is related by the following equation.

$$I_s = f_s K \cdot W(x \cdot y) \cdot R(x \cdot y) ds$$

(In the above equation, K denotes a proportional constant; R(x,y) represents a reflection factor at each point; ds expresses an area of the point (x, y); and S is a region of the reflecting layer.)

In general, the value W(x, y) can not be expressed by an analytical equation, and the value $I_s$ cannot be simply found out in any other way than numerical calculation using an electronic computer.

Now assume that, in the three kinds of beam splitters having three mutually different beam splitting areas, as shown in FIGS. 7A, 7B and 7C, the light metering area for the center-preferred average light metering is $S_1$, the light metering area for the partial light metering is $S_2$, and the light metering area for the spot light metering is $S_3$. When the reflection factor R is determined to satisfy a relationship of $I_{s1} = I_{s2} = I_{s3}$, the light quantity to be led to the photo-detector for each type of the light metering systems can be made constant.

For example, calculation done by the present inventors indicates that the ratio of the reflection factor is approximately 1:3, when a beam splitter for the partial light metering having a region of 11$\phi$m and one for the spot light metering having a region of 6$\phi$m are to be manufactured, the results being substantially coincident from an experimental standpoint.

As stated in the foregoing, the light metering device according to the embodiments of the present invention makes it possible to perform photographic operations by simple exchange of the light metering unit in the camera and without necessity for any troublesome exposure correction, i.e., by controlling and setting the reflection factor of the reflecting layer in the beam splitter for use in accordance with the light metering region of the light metering system.

What we claim is:

1. A system for measuring incident light, comprising:
    (a) an optical system defining an optical path;
    (b) photo-detecting means;
    (c) a plurality of beam splitters each adapted to be disposed in the optical path with, at any one time, only one of said plurality of beam splitters being disposed in the optical path; each of said beam splitters being disposable in the optical path at a predetermined position relative to said photo-detecting means; each of said plurality of beam splitters further having a diffraction grating of a different predetermined area and, upon reception of light from said optical system, forming converging split light which is directed to said photo-detecting means; and
    (d) means for measuring the light received by said photo-detecting means, a light converging point of said converging split light being positioned to correspond to the predetermined area of the beam splitter.

2. The system as set forth in claim 1, wherein each said beam splitter is a relief type diffraction lattice formed in a transparent substrate.

3. A system for measuring incident light, comprising:
 (a) an optical system defining an optical path;
 (b) photo-detecting means;
 (c) means for measuring light received by said photo-detecting means; and
 (d) a plurality of beam splitters each adapted to be disposed in the optical path with, at any one time, only one of said plurality of beam splitters being disposed in the optical path; each said of beam splitters disposable in the optical path being adapted to direct split light to said photo-detecting means; each said beam splitter further having a predetermined area different from the predetermined area of others of said beam splitters, each said beam splitter still further having a plurality of semi-reflecting oblique surfaces.

4. The system as set forth in claim 3, wherein each said semi-reflecting oblique surface forms a curved line in a plane.

5. The system as set forth in claim 1 or 3, wherein said optical system includes a view-finder of a photographic camera, and each said beam splitter may be positioned in the vicinity of a focusing plane of said photographic camera.

* * * * *

UNITED STATES PATENT AND TRADEMARK OFFICE
CERTIFICATE OF CORRECTION

PATENT NO. : 4,486,096

DATED : December 4, 1984

INVENTOR(S) : KIYONOBU ENDO, ET AL.

It is certified that error appears in the above-identified patent and that said Letters Patent is hereby corrected as shown below:

Column 1, line 14, after "lens" delete "1" and insert --,--;
         line 27, after "devices" delete --,--.

Column 3, line 23, "zero-oder" should read --zero-order--;
         line 33, "meterd" should read --metered--.

Column 6, line 32, after "characteristics" delete --to provide--.

Column 12, line 10, in the equation "f" should be --$f$--;
         line 19, after "than" insert --by a--.

Column 13, line 12, "said of", should read --of said--.

Signed and Sealed this

Twenty-eighth Day of January 1986

[SEAL]

Attest:

DONALD J. QUIGG

Attesting Officer     Commissioner of Patents and Trademarks